United States Patent
Bouvier et al.

(10) Patent No.: US 11,528,434 B1
(45) Date of Patent: Dec. 13, 2022

(54) PULSED LIGHT IMAGING USING ROLLING SHUTTER IMAGE SENSORS

(71) Applicant: Verily Life Sciences LLC, South San Francisco, CA (US)

(72) Inventors: Aurelien Bouvier, Woodside, CA (US); Nishant Verma, Burlingame, CA (US); James Polans, San Francisco, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 0 days.

(21) Appl. No.: 17/562,781

(22) Filed: Dec. 27, 2021

Related U.S. Application Data

(60) Provisional application No. 63/147,417, filed on Feb. 9, 2021.

(51) Int. Cl.
*H04N 5/353* (2011.01)
*H04N 9/04* (2006.01)

(52) U.S. Cl.
CPC ....... *H04N 5/3532* (2013.01); *H04N 9/04557* (2018.08)

(58) Field of Classification Search
CPC ..... A61B 1/04; H04N 5/3532; H04N 9/04557
See application file for complete search history.

(56) References Cited

U.S. PATENT DOCUMENTS

| | | | | |
|---|---|---|---|---|
| 7,876,955 | B2* | 1/2011 | Komiya | G01J 3/524 |
| | | | | 382/128 |
| 7,956,914 | B2* | 6/2011 | Xu | H04N 5/35581 |
| | | | | 348/308 |
| 8,785,833 | B2* | 7/2014 | Yabe | G03B 15/05 |
| | | | | 600/109 |
| 8,866,893 | B2* | 10/2014 | Ono | H04N 5/2354 |
| | | | | 348/68 |
| 9,386,236 | B2* | 7/2016 | Muller | G02B 21/004 |
| 9,516,239 | B2* | 12/2016 | Blanquart | H04N 5/2256 |
| 10,194,789 | B2 | 2/2019 | Seto | |
| 10,419,703 | B2 | 9/2019 | Goma et al. | |
| 10,575,720 | B2* | 3/2020 | Kagawa | A61B 1/00057 |

(Continued)

OTHER PUBLICATIONS

International Search Report and Written Opinion dated Mar. 22, 2022, in corresponding International Patent Application No. PCT/US2021/065243, 10 pages.

*Primary Examiner* — Brian P Yenke
(74) *Attorney, Agent, or Firm* — Christensen O'Connor Johnson Kindness PLLC

(57) ABSTRACT

An imaging system and method for imaging a scene using a rolling shutter are described. In an embodiment, the method includes illuminating a scene with first and second illumination light; generating frame signals with a photodetector comprising a plurality of pixels arranged in a plurality of rows, wherein the frame signals are based on light received from the scene with sequentially integrated rows of pixels of the plurality of rows, and wherein a frame signal includes signals from pixels of each of the plurality of rows; and generating images of the scene based on an intensity of the frame signals and the proportion of the first illumination light and the second illumination light emitted onto the scene during the first and second frames, wherein a proportion of the first illumination light and the second illumination light in a first frame is different than in a second frame.

20 Claims, 16 Drawing Sheets

(56) References Cited

U.S. PATENT DOCUMENTS

| | | | |
|---|---|---|---|
| 10,992,848 B2* | 4/2021 | Murray | H04N 5/2351 |
| 11,159,735 B2* | 10/2021 | Watson | A61B 90/361 |
| 2011/0101102 A1 | 5/2011 | Hussey et al. | |
| 2014/0078277 A1 | 3/2014 | Dai et al. | |
| 2014/0371535 A1 | 12/2014 | Seto | |
| 2017/0270382 A1 | 9/2017 | Rephaeli et al. | |
| 2017/0367891 A1* | 12/2017 | Magnusson | B23K 9/322 |
| 2018/0020170 A1* | 1/2018 | Pichette | H04N 5/2256 |
| 2020/0111193 A1* | 4/2020 | Rephaeli | G06T 3/4015 |
| 2020/0154024 A1 | 5/2020 | Watson et al. | |
| 2020/0234439 A1* | 7/2020 | Chang | H04N 5/2354 |
| 2020/0374479 A1 | 11/2020 | Wang et al. | |
| 2022/0086412 A1* | 3/2022 | Verma | H04N 5/2354 |

* cited by examiner

*A composite image acquired using a visible light image and a near-infrared fluorescent light image overlaid on the visible light image*

PULSED LIGHT IMAGING USING ROLLING SHUTTER IMAGE SENSORS

CROSS REFERENCE TO RELATED APPLICATIONS

This application claims the benefit of U.S. provisional application No. 63/147,417 filed Feb. 9, 2021, which is hereby incorporated by reference in its entirety.

TECHNICAL FIELD

The present disclosure generally relates to adjusting an image captured by an imaging system and, in particular but not exclusively, relates to a rolling shutter imaging system

BACKGROUND INFORMATION

Certain conventional imaging systems use a rolling shutter in which frame readout occurs sequentially row by row. This type of frame readout takes a finite amount of time to complete and is typically on the order of several milliseconds. During this readout time, some rows are still integrating a previous frame and readout has not happened for those rows, some rows are not integrating while waiting for the next row reset, and some rows have already started integrating the next frame where row reset has already taken place.

Currently, applications that capture pulsed light using a rolling shutter sensor do so during the sensor blanking time. Rolling shutters, however, present a compromise between a fast frame rate and a maximum pulse duration for imaging systems using pulsed light.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of an imaging system; a non-transitory, machine-readable storage medium; and method for imaging a scene using a rolling shutter are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Rolling shutter image sensors have intrinsic limitations, which currently impose restrictions on the highest frame rates that can be achieved using a pulsed light imaging system as rolling shutter image sensors are currently used. The present disclosure addresses or mitigates these limitations through the combined use of pulsed light patterns and algorithm reconstruction techniques.

Using pulsed light illumination, one can capture multiple frames under different illumination conditions, such as with different spectral or spatial profiles. These multiple frames can be combined into a single image that contains richer information due in part to these different spectral or spatial profiles.

Figure 1:
FIG. 1 is a composite image acquired using a visible light image and a near-infrared fluorescent light image overlaid on the visible light image.

For endoscopic applications, multiple frames can be combined for multispectral imaging images of a scene with different spectral lighting in order to enhance specific image features. Additionally, structured light illumination can be used with a white light illumination in order to extract depth information from an illuminated scene. Further, color indocyanine green (ICG) modes used in endoscopy can be used to acquire a visible wavelength image using white light on top of which is overlaid an image acquired using near-infrared light from the ICG dye (see, for example, FIG. 1).

Figure 2:
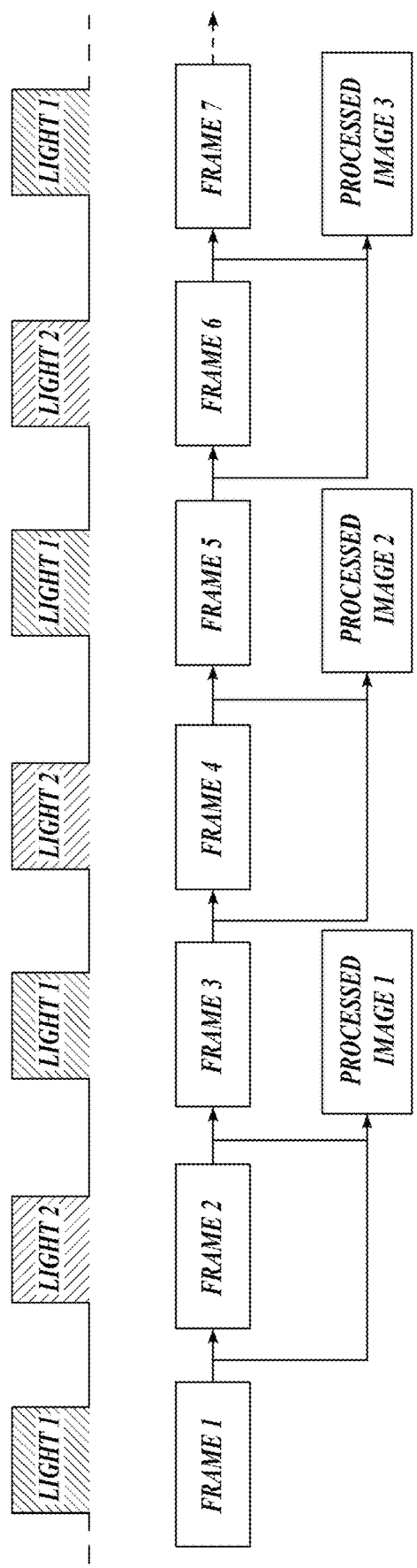
FIG. 2 schematically illustrates pulsed, multi-spectral light used to illuminate a scene and generate processed images.

FIG. 2 illustrates this mode of operation when simply using two types of illumination. It is important to note a processed or composite image will be displayed at a slower frame rate than the image sensor frame rate, since the image sensor processes multiple captured input frames in order to display a single output image. For example, using two types of illumination, as in FIG. 2, the displayed frame rate is half of the captured frame rate. This means that for a given displayed frame rate, usually determined to provide a smooth viewing experience, higher image sensor frame rates provide the ability to capture multiple scene illuminations. This can be used for advanced features without impact on the displayed frame rate experience.

Figure 3:
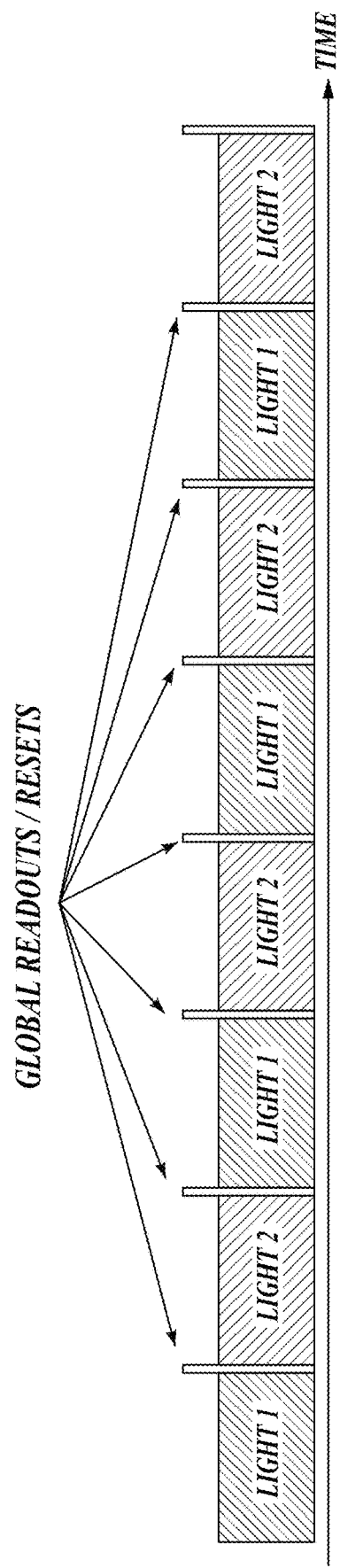
FIG. 3 schematically illustrates pulsed light used to illuminate a scene and captured with a global shutter image sensor.

For a relatively fast frame rate, an imaging system should be capable of switching from one illumination to the next with short down times. Certain conventional systems use a global shutter image sensor, which is capable of global resets and readouts, as shown in FIG. 3.

A drawback of global shutter image sensors is that the pixel size is generally much larger than typical rolling shutter image sensors, since additional pixel transistors are needed to enable the global shutter functionality. This generally leads to a larger form factor for a given pixel resolution, lower resolution for a given form factor, and, in certain instances, lower quantum efficiency or fill factor. Such characteristics can limit the applicability of global shutter image sensors in, for example, endoscopy applications. Additionally, rolling shutter sensors are also more generally available, making the supply chain easier to set up. It is, therefore, advantageous to use a rolling shutter image sensor for pulsed light applications.

Figure 4:
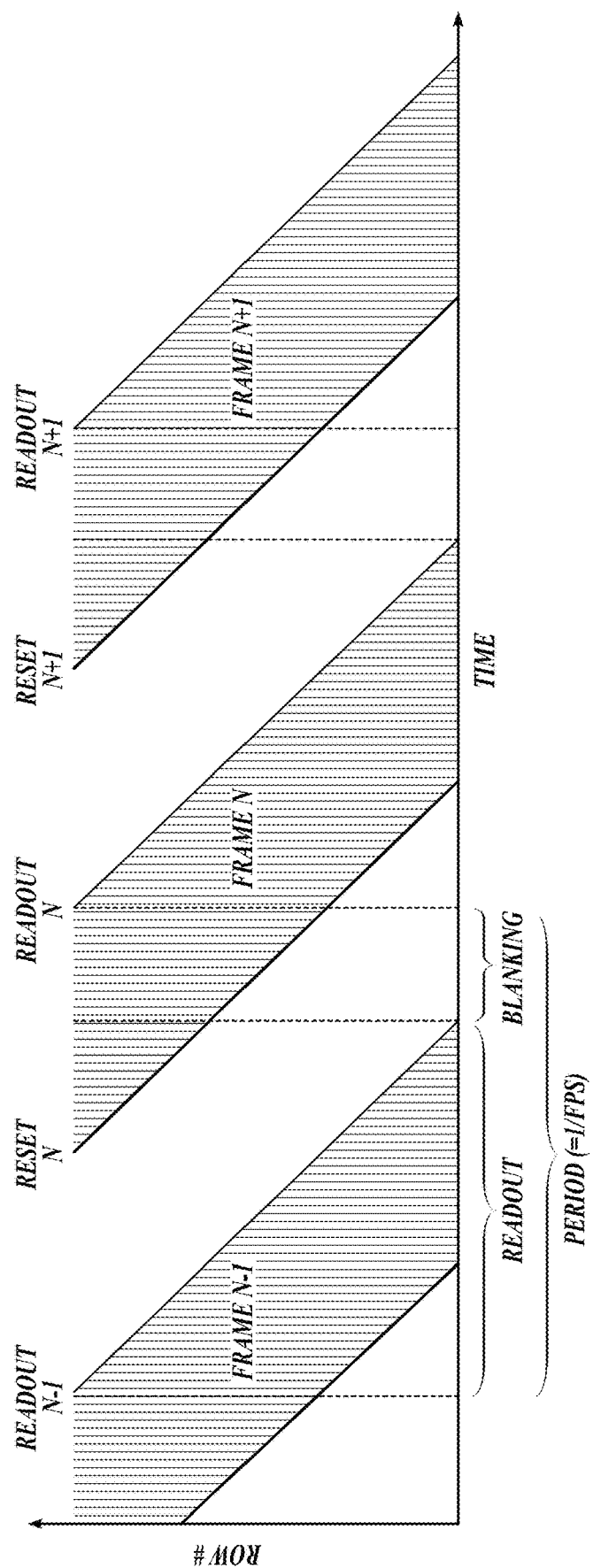
FIG. 4 schematically illustrates pulsed light conventionally imaged using a rolling shutter image sensor.

A drawback of rolling shutter image sensors is that frame readout happens sequentially row-by-row, which takes a finite amount of time to complete, typically on order of several milliseconds. During this readout time, some rows are still integrating a previous frame where readout has not happened for those rows, some rows are not integrating and are waiting for the next row reset, and some rows have already started integrating the next frame where row reset has already taken place. This is illustrated in FIG. 4, which shows the behavior of the reset and readout pointers over time in conventional use of rolling shutters.

Figure 5:
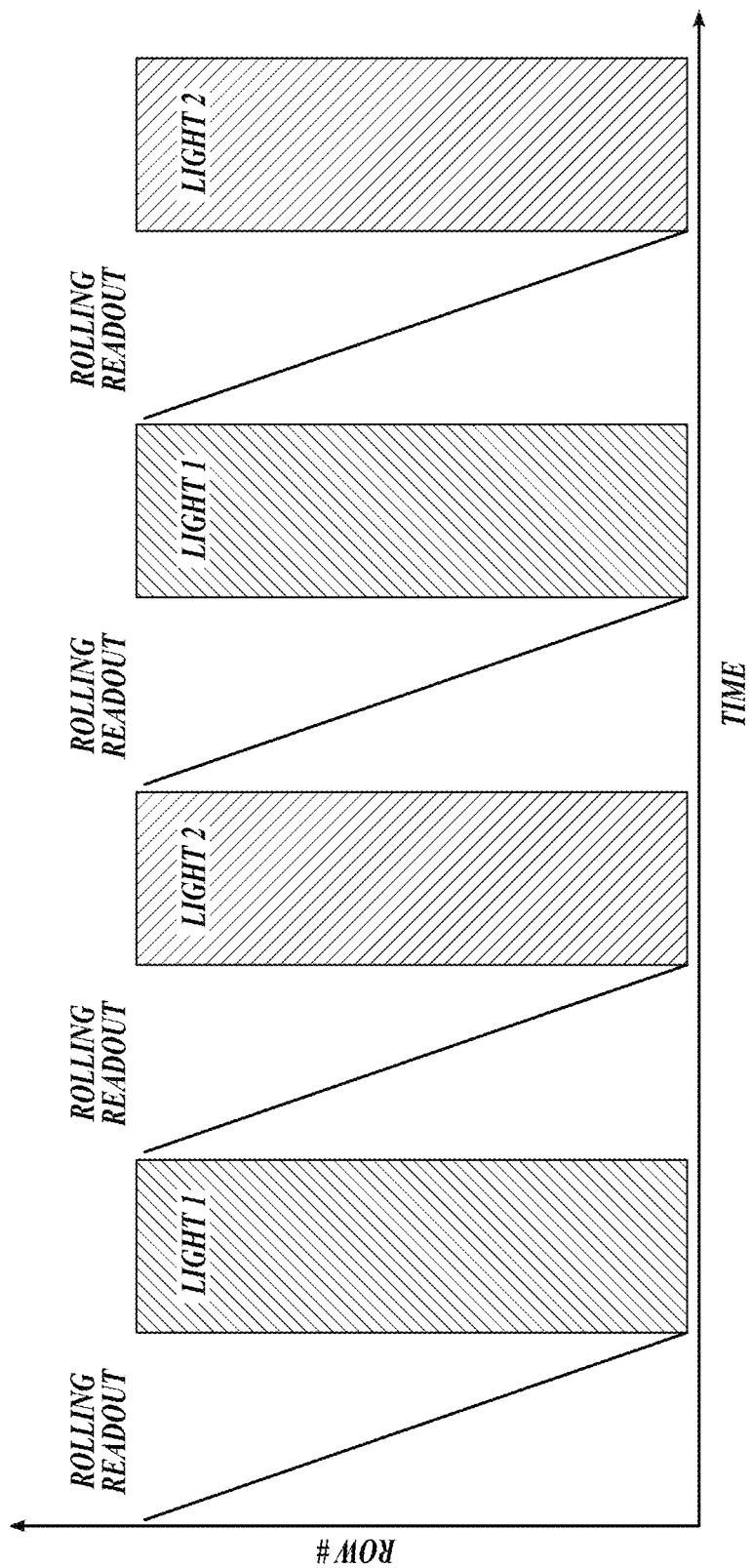
FIG. 5 schematically illustrates pulsed light conventionally imaged using a rolling shutter image sensor.
Figure 6:
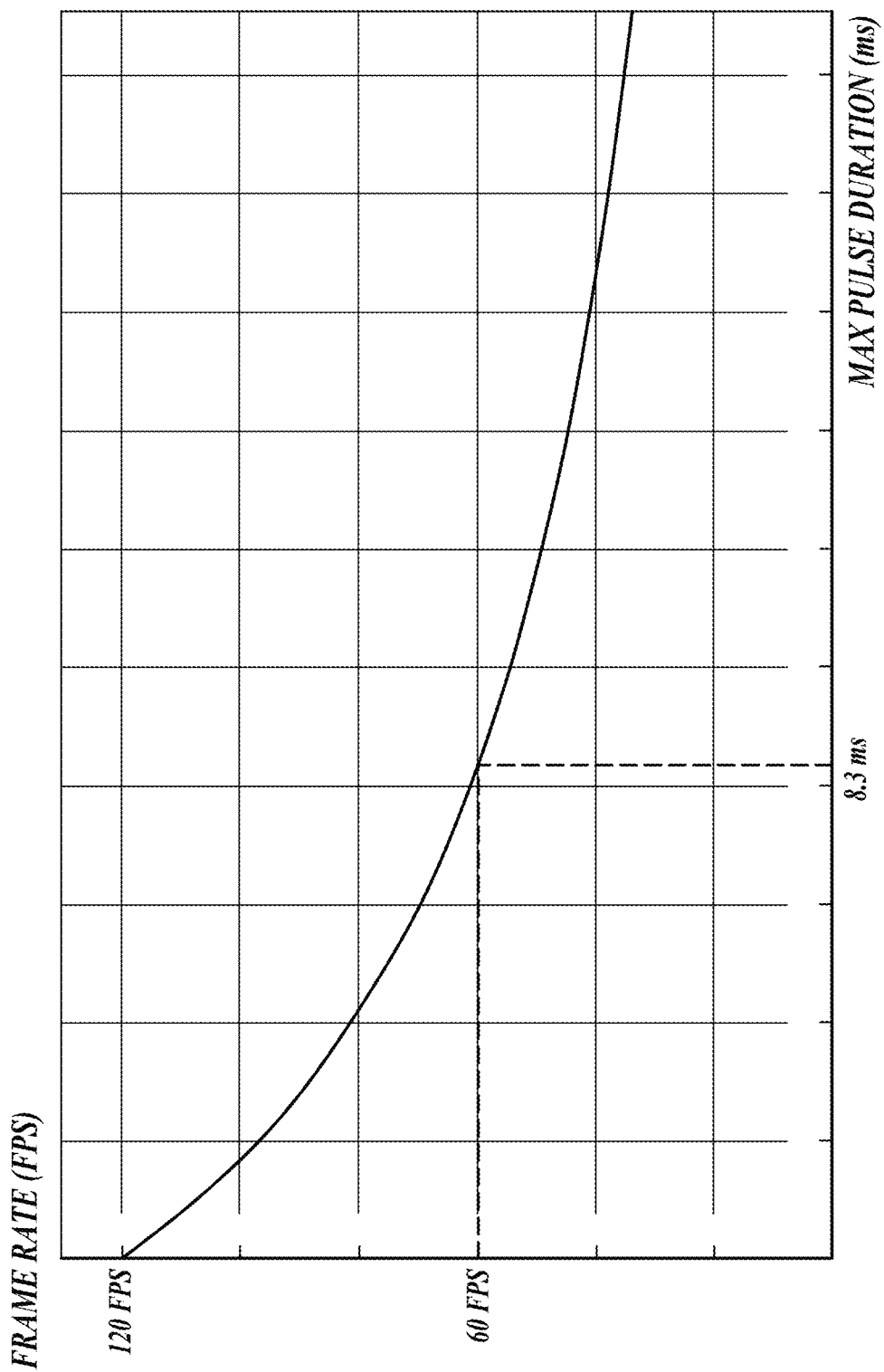
FIG. 6 illustrates a comparison of frame rate as a function of a maximum pulse duration using a rolling shutter.

Given this behavior, for each frame to capture a single type of illumination, pulsed light is conventionally used during blanking time only assuming row reset is triggered immediately after row readout as shown in FIG. 5. Although this provides clean illumination within a single frame, it has a significant impact on the fastest frame rate that can be achieved since no light is pulsed/integrated during frame readout. For a given application, it is, therefore, a compromise between a fast frame rate and a maximum pulse duration required as illustrated in FIG. 6. It is also a significant limitation in achieving a high signal-to-noise ratio since a light is pulsing only during a fraction of the frame integration time (i.e., only noise is being integrated the rest of the time).

In rolling shutter applications, the fastest frame rate is achieved when blanking time is reduced to zero (i.e., the sensor is constantly in rolling readout). In such instances, the ability to cleanly pulse light within a single frame is no longer possible. As a result, each frame may be a combination of at least two different illuminations.

The present disclosure provides systems, methods, and machine-readable storage media for operating pulsed light imaging systems at the highest frame rate when a rolling shutter sensor is in use. As set forth in greater detail elsewhere herein, by timing pulsed illumination differently frame to frame, it is possible to decouple signals originating from individual illuminations using the content of individual data frames. As used in the present systems, light pulsed during rolling readout is captured by at least two sequential frames. The present disclosure provides light pulsing patterns and signal processing techniques to disentangle individual pulsed illumination from sequential sensor frames.

Figure 7A:
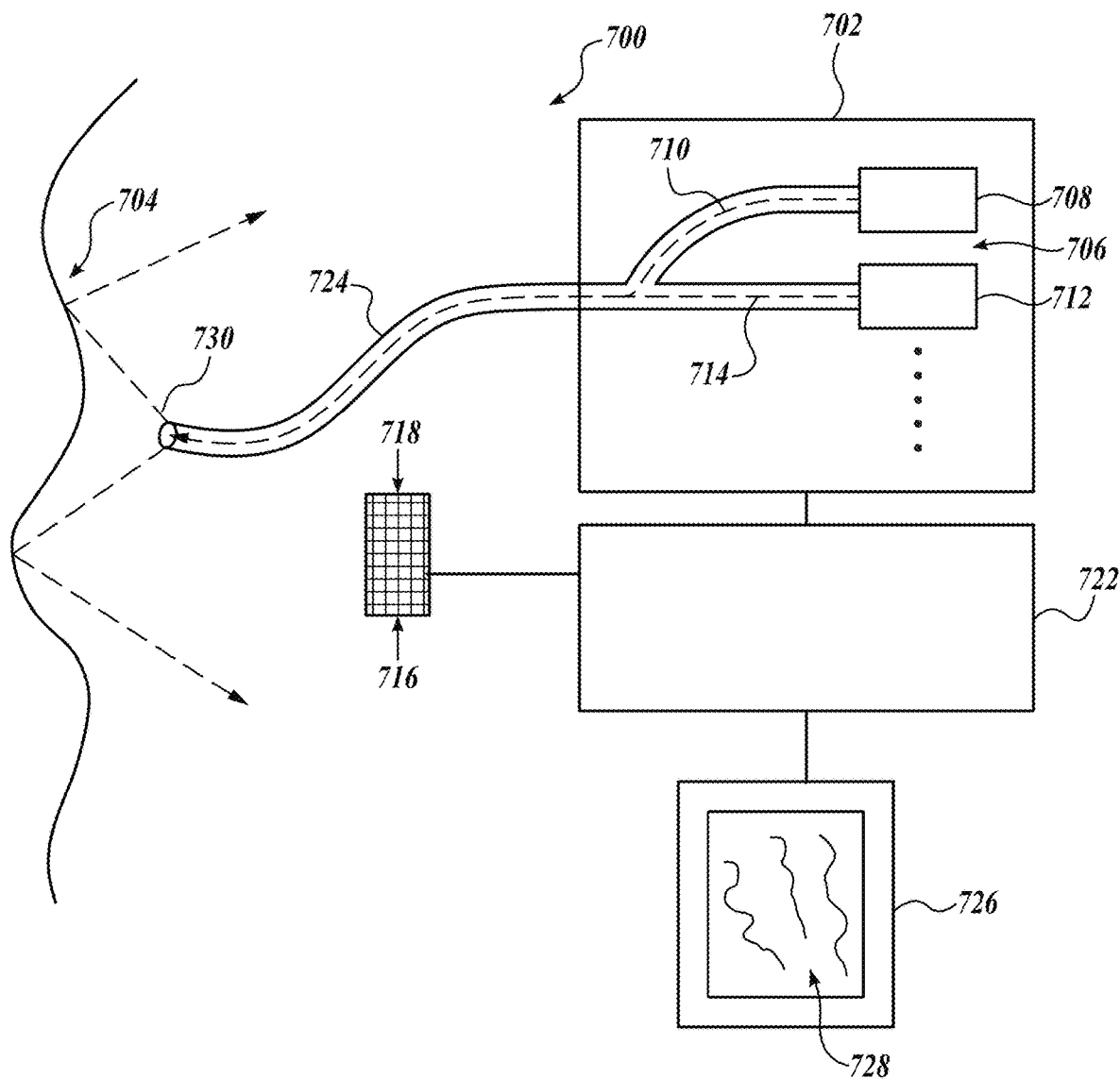
FIG. 7A schematically illustrates an imaging system, in accordance with an embodiment of the present disclosure.
Figure 7B:
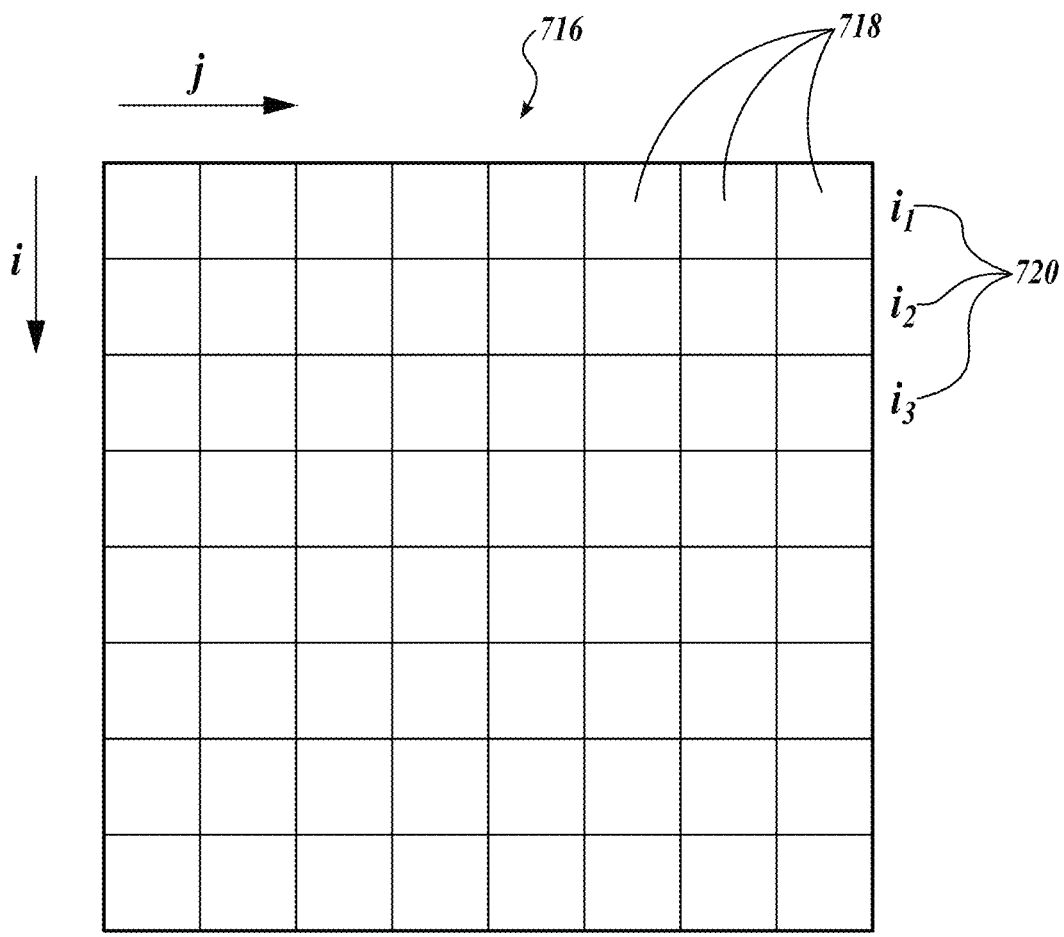
FIG. 7B illustrates an example of a photodetector of the system of FIG. 7A, in accordance with an embodiment of the present disclosure.

Attention is now directed to FIGS. 7A and 7B, in which a system 700 in accordance with an embodiment of the present disclosure is illustrated. In the illustrated embodiment, the system 700 is shown to include a light engine 702 configured to illuminate a scene 704 with illumination light 730 and including a plurality of light sources 706; a photodetector 716 positioned to receive light, such as illumination light 730, from the scene 704; and a controller 722 operatively coupled to the light engine 702 and the photodetector 716.

In the illustrated embodiment, the light engine 702 is shown to include a first light source 708 and a second light source 712. In an embodiment, the first light source 708 configured emit first illumination light 710 and the second light source 712 configured to emit second illumination light 714. In an embodiment, the first illumination light 710 is in a first wavelength range, and the second illumination light 714 is in a second wavelength range different from the first wavelength range. In an embodiment, the first wavelength range does not overlap with the second wavelength range. In an embodiment, the first wavelength range overlaps with the second wavelength range. In an embodiment, the first wavelength range is within a visible wavelength range, such as between about 400 nm and about 700 nm, and the second wavelength range is outside of the visible wavelength range, such as in an infrared wavelength range of about 700 nm and about 1 mm. In an embodiment, the each of the first and second wavelength range is within a visible wavelength range.

By having different wavelength ranges illuminating the scene 704, such light received by the photodetector 716 reflected off the scene 704 can provide richer imaging information. In this regard, features visualized by different wavelength ranges can be identified and displayed providing additional information to a user.

While a light engine 702 including two light sources is illustrated, it will be understood that the light engines of the present disclosure can include two, three, four, five, or more light sources, and that the techniques and methods described herein can be extended to any number of light sources.

In an embodiment, the plurality of light sources 706 includes one or more lasers, light-emitting diodes, incandescent light sources, and the like. In an embodiment, the light sources of the light engine 702 include lasers.

In an embodiment, the light engine 702 includes one or more light sources, such as the second light source 712, configured to emit structured light. Such structured light can include light having a known pattern, such as including a number of dots or lines arranged in a known configuration. As discussed further herein, structured light emitted onto the scene 704 can be used to determine a distance between features of the scene 704 and the photodetector 716 based on distortion or deformation of the known pattern due to topography of the scene 704.

As shown, the system 700 further includes an endoscope 724 coupled to the light engine 702. In this regard, the endoscope 724 is configured to receive illumination light 730 from the light engine 702 and transmit it through the endoscope 724 onto the scene 704. In an embodiment, the endoscope 724 is configured to enter into a portion of the body the illuminate the scene 704. In this regard, in an embodiment, the scene 704 is a surgical scene 704. In an embodiment, the photodetector 716 is positioned at a proximal end of the endoscope 724, such as adjacent to the light engine 702. In other embodiments, the photodetector 716 is positioned at a distal end of the endoscope 724 configured to enter into the portion of a body, such as to directly image the scene 704.

As above, the system 700 includes a photodetector 716 positioned to receive light from the scene 704. As shown in FIG. 7B, the photodetector 716 includes a plurality of pixels 718. In the illustrated embodiment, the plurality of pixels 718 is arranged in a plurality of rows 720 i and columns j. As discussed further herein, in an embodiment, the pixels read out row-by-row, such that pixels in a first row, $i_1$, integrate or generate signals based on light received by the pixels in the first row, $i_1$, and, subsequently, pixels in a second row, $i_2$, immediately adjacent to the first row, $i_1$, integrate or generate signals based on light received by the pixels in the second row, $i_2$. In this way, the photodetector 716 can sequentially integrate pixels row-by-row ($i_1$, $i_2$, $i_3$, . . . ) to use the photodetector 716 as a rolling shutter. In an embodiment, the photodetector 716 is in constant readout, such that blanking time is zero. In this regard, at least one row of pixels is integrating at a given time during operation of the photodetector 716.

As above, the system 700 includes a controller 722 operatively coupled to the photodetector 716 and the light engine 702. In an embodiment, the controller 722 is configured to choreograph operation of components operatively coupled thereto, such as in performing one or more methods of the present disclosure. In an embodiment, the controller 722 includes logic that, when executed by the controller 722, causes the system 700 to perform operations. Such operations can include one or more methods of the present disclosure.

In an embodiment, the controller 722 includes logic that, when executed by the controller 722, causes the system 700 to perform operations including illuminating the scene 704 with the first illumination light 710 from the first light source 708 and the second illumination light 714 from the second light source 712. In an embodiment, illuminating the scene 704 with the first illumination light 710 and the second illumination light 714 includes emitting a plurality of pulses of the first illumination light 710 with the first light source 708; and emitting a plurality of pulses of the second illumination light 714 with the second light source 712 interleaved between the plurality of pulses of the first illumination light 710, wherein a light pulse of the plurality of first illumination light 710 is captured by two sequential frames. In an embodiment, a light pulse of the plurality of the second illumination light 714 is captured by two sequential frames. As discussed further herein, by eliminating blanking time and pulsing light such that one pulse is captured by two sequential frames, such as two sequential frames of the photodetector 716, a frame rate of the system 700 can be increased and/or a signal-to-noise ratio of the system increased.

In an embodiment, a proportion of the first illumination light 710 and the second illumination light 714 in a first frame is different than in a second frame. As discussed further herein, by having adjacent frames with different proportions of first and second illumination, signals generated by the photodetector 716 based on the illumination light can be disentangled or otherwise differentiated. In this regard, in an embodiment, pulsing patterns emitted by the system 700 in adjacent frames can have different pulse patterns or pulse durations. In an embodiment, a pulse of the plurality of pulses of the first illumination light 710 has a duration different than a duration of a pulse of the plurality of pulses of the second illumination light 714.

As noted above, the photodetector 716 comprises a plurality of pixels 718 responsive to light. In an embodiment, the photodetector 716 is configured to generate signals based upon light received by the photodetector 716, such as based on the wavelength or intensity of light received by the plurality of pixels 718. In an embodiment, the controller 722 includes logic that, when executed by the controller 722, causes the system 700 to perform operations including generating frame signals with the photodetector 716 based on light received from the scene 704 with sequentially integrated rows of pixels of the plurality of rows 720.

In an embodiment, a frame signal includes signals from pixels of each of the plurality of rows 720. In an embodiment, a frame signal comprises signals from each of the plurality of rows 720 that have been sequentially integrated. In an embodiment, generating frame signals with the photodetector 716 based on light received from the scene 704 with sequentially integrated rows of pixels of the plurality of rows 720 includes generating first signals with a first row of pixels of the photodetector 716 based on light received from the scene 704 during a first integration time; and generating second frame signals with a second row of pixels of the photodetector 716 based on light received from the scene 704 during a second integration time, wherein the second row of pixels is immediately adjacent to the first row of pixels and the second integration time is after, such as immediately after, the first integration time.

In the illustrated embodiment, the system 700 includes a display 726 operatively coupled to the controller 722. In an embodiment, the display 726 is suitable to display an image 728 of the scene 704 based on signals generated by the photodetector 716. In an embodiment, the controller 722 is configured to differentiate and/or disentangle frame signals generated by the photodetector 716 based on light received from the scene 704, such as frame signals based on adjacent frames. In an embodiment, the controller 722 includes logic that, when executed by the controller 722, causes the system 700 to perform operations including generating images of the scene 704 based on an intensity of the frame signals and the proportion of the first illumination light 710 and the second illumination light 714 emitted onto the scene 704 during the first and second frames. In an embodiment, such differentiation and/or disentanglement of photodetector 716 signals includes use of one or more of the methods of the present disclosure as set forth further herein.

In an embodiment, the system 700 includes a filter positioned to filter first illumination light 710 and second illumination light 714 received from the scene 704 and provide filtered light to the photodetector 716. In the embodiment illustrated in FIG. 13A, the filter comprises: a plurality of first filter pixels positioned to filter illumination light incident on a first set of pixels of the photodetector 716 and configured to transmit light in a first filtered wavelength range; and a plurality of second filter pixels positioned to filter illumination light incident on a second set of pixels of the photodetector 716 and configured to transmit light in a second filtered wavelength range, wherein the second filtered wavelength range is different than the first filtered wavelength range. As discussed further herein with respect to the methods of the present disclosure, by simultaneously integrating different wavelength channels of the photodetector 716 in conjunction with such a filter, additional data can be obtained from light received from the scene 704 and absorbed by the photodetector 716.

In another aspect, and as set forth in greater detail below, the present disclosure provides methods for using a rolling shutter image sensor in order to run it at the highest supported frame rate. By timing the pulsed illumination differently frame-to-frame, it is possible to decouple signals originating from individual illuminations using the content of each data frame. As described above, in certain embodiments, illumination light is pulsed during rolling readout. In this regard, a single light pulse is captured by at least two sequential frames.

Figure 8:
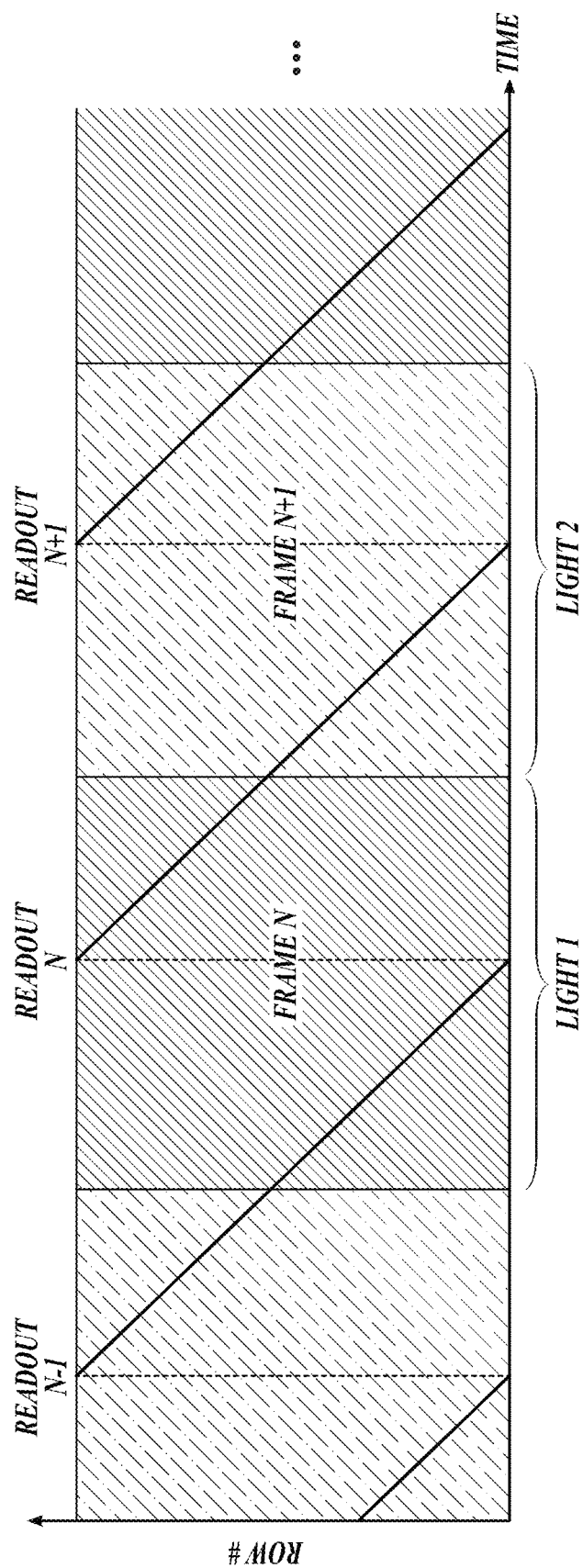
FIG. 8 illustrates pulsed first and second light and frames capturing the pulsed the first and second light, in accordance with an embodiment of the present disclosure.

Embodiments of the methods of the present disclosure will now be explained with respect to FIG. 8 using principles and techniques that can be generalized. FIG. 8 shows a light pattern that can be used to disentangle two pulsed illuminations originating from separate sources, such first and second light sources, and referred to in FIG. 8 as 'light 1' and 'light 2'. Each frame captures a mixture of the two illuminations, light 1 and light 2. Depending on the sensor row, the ratio of light 1 compared to light 2 that is integrated within a single frame will vary. For example, FIGS. 9A and 9B illustrate the ratios of light captured in frame N (FIG. 9A) vs N+1 (FIG. 9B) in FIG. 8.

Figures 9A, 9B:
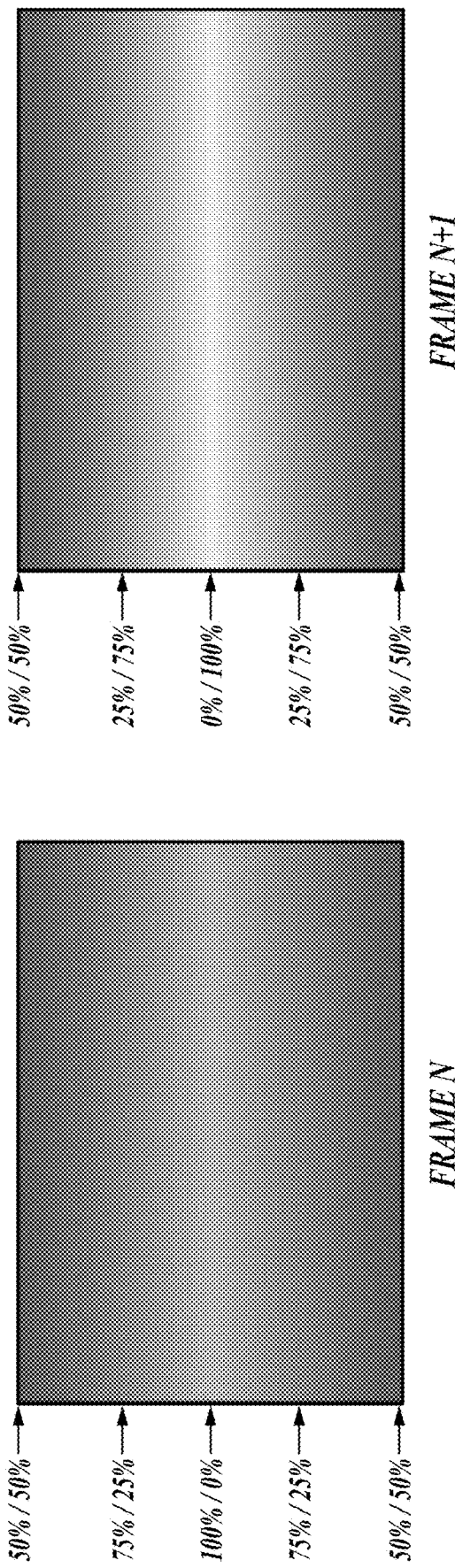
FIGS. 9A and 9B illustrate ratios of first and second light captured in frames N (FIG. 9A) and N+1 (FIG. 9B) in FIG. 8, in accordance with an embodiment of the disclosure.

As shown in FIGS. 9A and 9B, the middle row has the cleanest light separation since it is the closest to pure illumination within each individual frame. The top/bottom rows of the image show the illumination ratio becoming more and more mixed, reaching a 50/50 ratio for the most top/bottom row of the sensor frame. Unmixing the first illumination light and second illumination light is most straightforward around the middle of the frame since the ratios are the cleanest or least mixed. However, for the top/bottom of the frame, unmixing the two illuminations is harder, since the difference in integrated illuminations is not as pronounced between two sequential frames, N and N+1.

Figure 10:
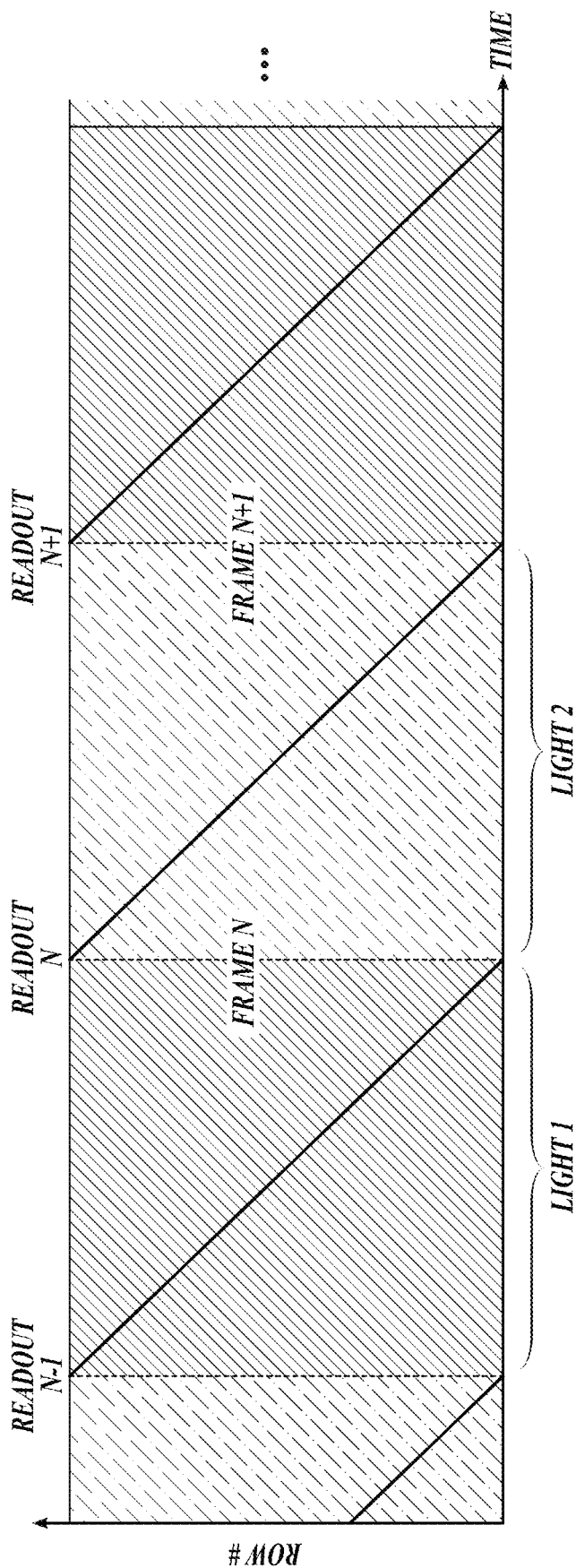
FIG. 10 illustrates pulsed first and second light and frames capturing the pulsed the first and second light, in accordance with an embodiment of the present disclosure.

It is noted that the pulsing pattern illustrated in FIG. 8 was chosen in order to provide the cleanest illumination ratios in the middle of the image as this is where image quality matters the most in certain embodiments. However, if another part of the image is preferred, it is possible to offset the pulsing profile in time in order to get the cleanest illumination ratios in another part of the image. For example, the pulsed light pattern of FIG. 10 yields the cleanest illumination ratios at the top/bottom of the image. One reason to alter the row number of the cleanest illumination ratio is to balance the signal-to-noise across the field-of-view. For example, better uniformity of noise can be obtained by averaging three 'pairs' of images where the row location of the 100% ratio changed. This would come at the cost of reduced framerate. Additionally, because the ratio is known, the noisier and less noisy rows could be applied in a weighted average proportional to its noise.

Even though each frame contains a mixture of the two illuminations, it is possible to extract the signal intensity associated with each illumination by performing a signal unmixing as follows.

As discussed further herein, the photodetectors of the present disclosure, such as photodetector 716, include a plurality of pixels 718 arranged in rows i and columns j. Where frames N and N+1 are two input frames used for signal processing, $S_N(i,j)$ is a signal from pixel$_{i,j}$ from frame N and $S_{N+1}(i,j)$ is a signal from frame N+1. Further, frac$_1(i,j)$ is a fraction of the integration time this pixel was exposed to light 1, or first illumination light, and frac$_2(i,j)$ is a fraction of the integration time this pixel was exposed to light 2, or second illumination light 714.

These variables are known system parameters and can be calibrated out during manufacturing or saved in system data storage. In an embodiment, this method includes tight synchronization between the light engine and image sensor frame capture in order to determine precisely the fraction of light each row has received from each illuminator. In an embodiment, the light engine sends a signal or signals to the controller indicating when integration of the photodetector will, which is used to inform how the light engine emits illumination light onto the scene.

In an embodiment, $S_{L1}(i,j)$ is a signal received if this pixel was illuminated by light 1 during all of the integration time, and $S_{L2}(i,j)$ is a signal received if this pixel was illuminated by light 2 during 100% of the integration time.

For the center row as shown in FIG. 8, $S_{L1}(i,j)$ equals $S_N(i,j)$ and $S_{L2}(i,j)$ equals $S_{N+1}(i,j)$. Correspondingly, for rows ¼ and ¾ from the top of the frame $S_N(i,j)$ equals $0.75 S_{L1}(i,j)+0.25 S_{L2}(i,j)$, and $S_{N+1}(i,j)$ equals $0.25 S_{L1}(i,j)+0.75 S_{L2}(i,j)$.

From this, a ratio of $S_{L1}/S_{L2}$ can be retrieved as such:

$$S_{L1}(i,j)=(3S_N(i,j)-S_{N+1}(i,j))/2$$

$$S_{L2}(i,j)=(3S_{N+1}(i,j)-S_N(i,j))/2$$

More generally, for any row in the sensor frame:

$$S_N(i,j)=\text{frac}_1(i,j)S_{L1}(i,j)+\text{frac}_2(i,j)S_{L2}(i,j)$$

$$S_{N+1}(i,j)=(1-\text{frac}_1(i,j))S_{L1}(i,j)+(1-\text{frac}_2(i,j))S_{L2}(i,j)$$

Likewise, $S_{L1}/S_{L2}$ can be derived using the following equations:

$$S_{L1}(i,j) = \frac{frac2(i,j)}{frac1(i,j)-frac2(i,j)}\left[\frac{1-frac2(i,j)}{frac2(i,j)} \cdot S_N(i,j) - S_{N+1}(i,j)\right]$$

$$S_{L2}(i,j) = \frac{frac1(i,j)}{frac2(i,j)-frac1(i,j)}\left[\frac{1-frac1(i,j)}{frac1(i,j)} \cdot S_{N+1}(i,j) - S_N(i,j)\right]$$

It is noted that these equations are valid as long as frac$_2(i,j)$ is different from frac$_1(i,j)$. In other words, these equations are valid when the ratios are different that pure 50/50. This is because at a 50/50 ratio, sequential frames capture exactly the same illumination mixture preventing any unmixing of the two pulsed light intensities. Moreover, an error analysis would reveal that rows close to 50/50 ratios would yield large signal errors, since signals measured get eventually divided by 1/(frac$_2$-frac$_1$).

From the above equations, it is possible to generically describe signals from pixels in the photodetector in adjacent frames N and N+1. In an embodiment, a frame signal from a pixel$_{i,j}$ of the photodetector in a frame N is according to equation (1):

$$S_N(i,j)=\text{frac}_{N,L1}(i,j)S_{L1}(i,j)+\text{frac}_{N,L2}(i,j)S_{L2}(i,j) \qquad \text{equation (1),}$$

wherein— frac$_{N,L1}(i,j)$ is a fraction of an integration time that pixel$_{i,j}$ was exposed to the first illumination light during frame N, frac$_{N,L2}(i,j)$ is a fraction of the integration time that pixel$_{i,j}$ was exposed to the second illumination light during frame N, $S_{L1}(i,j)$ is a signal generated by pixel$_{i,j}$ if pixel$_{i,j}$ was illuminated by the first illumination light during all of the integration time, and $S_{L2}(i,j)$ a signal generated by pixel$_{i,j}$ if pixel$_{i,j}$ was illuminated by the second illumination light during all of the integration time.

In an embodiment, a frame signal from a frame N+1 immediately following frame N is according to equation (2):

$$S_{N+1}(i,j)=\text{frac}_{N+1,L1}(i,j)S_{L1}(i,j)+\text{frac}_{N+1,L2}(i,j)S_{L2}(i,j) \quad \text{equation (2),}$$

wherein $\text{frac}_{N+1,L1}(i,j)$ is a fraction of an integration time pixel$_{i,j}$ was exposed to the first illumination light during frame N+1, and $\text{frac}_{N+1,L2}(i,j)$ is a fraction of the integration time this pixel was exposed to the second illumination light during frame N+1.

Importantly, it is noted that these derivations above can be further generalized in order to be applicable beyond the specific light pattern shown in FIG. 8. Indeed, the illumination content of any pulsed light pattern using two illumination sources can be described with the following generic equations:

$$S_N(i,j)=\text{frac}_{N,L1}(i,j)S_{L1}(i,j)+\text{frac}_{N,L2}(i,j)S_{L2}(i,j)$$

$$S_{N+1}(i,j)=\text{frac}_{N+1,L1}(i,j)S_{L1}(i,j)+\text{frac}_{N+1,L2}(i,j)S_L$$

where—
$\text{frac}_{N,L1}(i,j)$: fraction of the integration time this pixel was exposed to light 1 during frame N,
$\text{frac}_{N,L2}(i,j)$: fraction of the integration time this pixel was exposed to light 2 during frame N,
$\text{frac}_{N+1,L1}(i,j)$: fraction of the integration time this pixel was exposed to light 1 during frame N+1, and
$\text{frac}_{N+1,L2}(i,j)$: fraction of the integration time this pixel was exposed to light 2 during frame N+1,
which are all known quantities which makes the linear equations above straightforward to solve.

Figure 11:
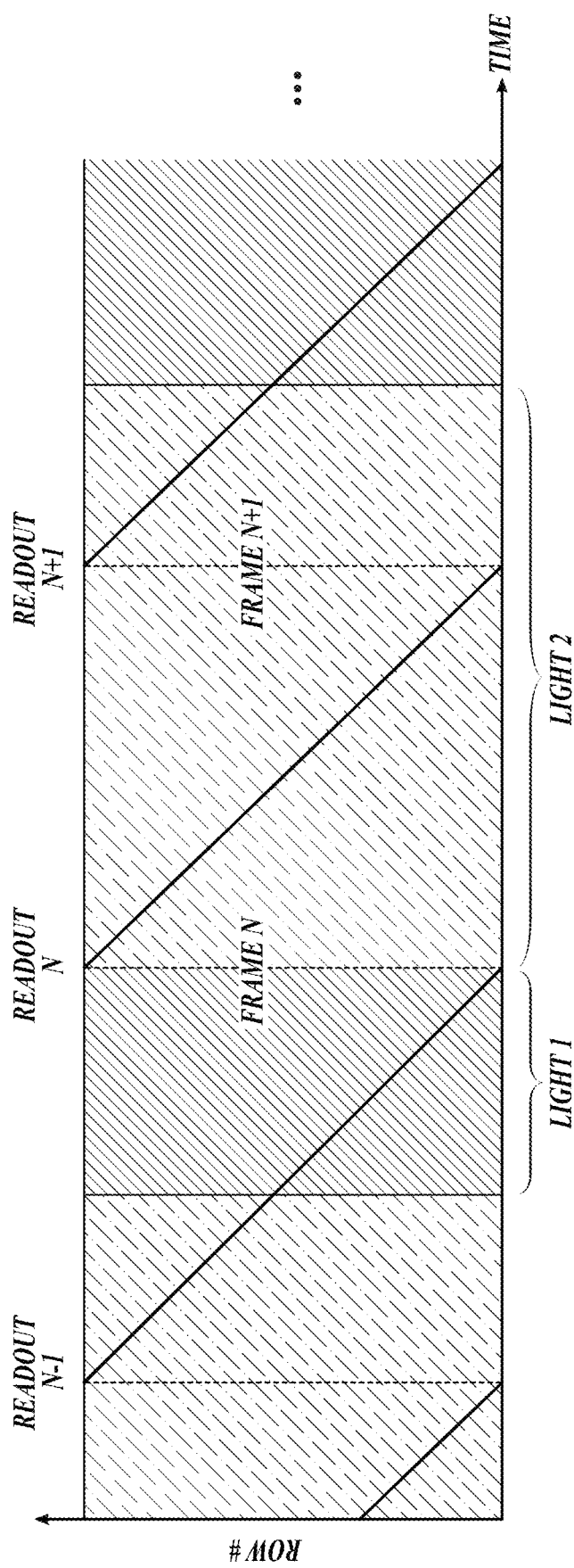
FIG. 11 illustrates pulsed first and second light and frames capturing the pulsed the first and second light, in accordance with an embodiment of the present disclosure.
Figure 12:
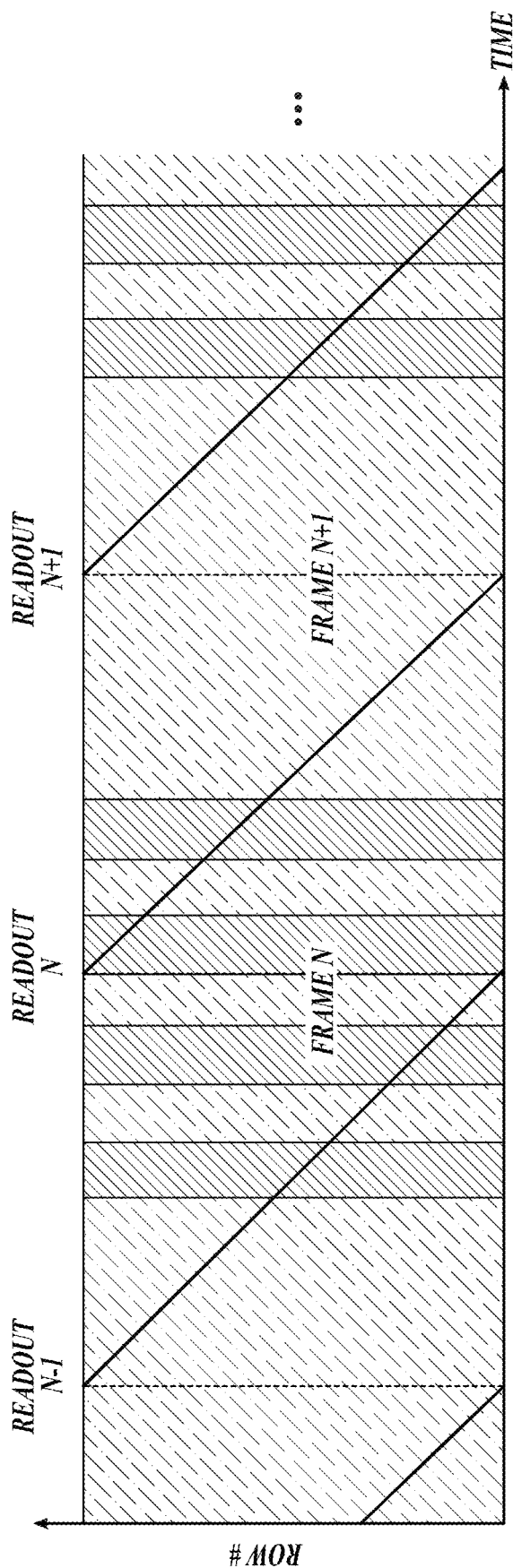
FIG. 12 illustrates pulsed first and second light and frames capturing the pulsed the first and second light, in accordance with an embodiment of the present disclosure.

In an embodiment, good signal unmixing is achieved by generating light patterns that yield different illumination mixtures for sequential frames. Many, many different patterns could be devised to achieve this. Embodiments of such examples are illustrated in FIGS. 11 and 12.

While the previous diagrams show only two illumination sources for the ease of understanding, this method is easily generalizable to more than two illumination sources. For a system with N illumination sources, the pulsing pattern may be serial (1, 2, 3, . . . , N, 1, 2, 3, . . . , N, 1, 2, . . . ) or may be non-serial (1, 2, N, 3, 4, N, . . . ) in nature. Similarly, the light pulses may be of the same or different pulse durations depending on signal-to-noise ratio requirements from each source, see for example FIGS. 11 and 12. Each frame will be a combination of more than one illumination source, but the mathematical logic described above can be naturally extended to unmix signals belonging to different illumination sources. An implementation of multispectral imaging can be achieved in this manner.

Figure 13A:
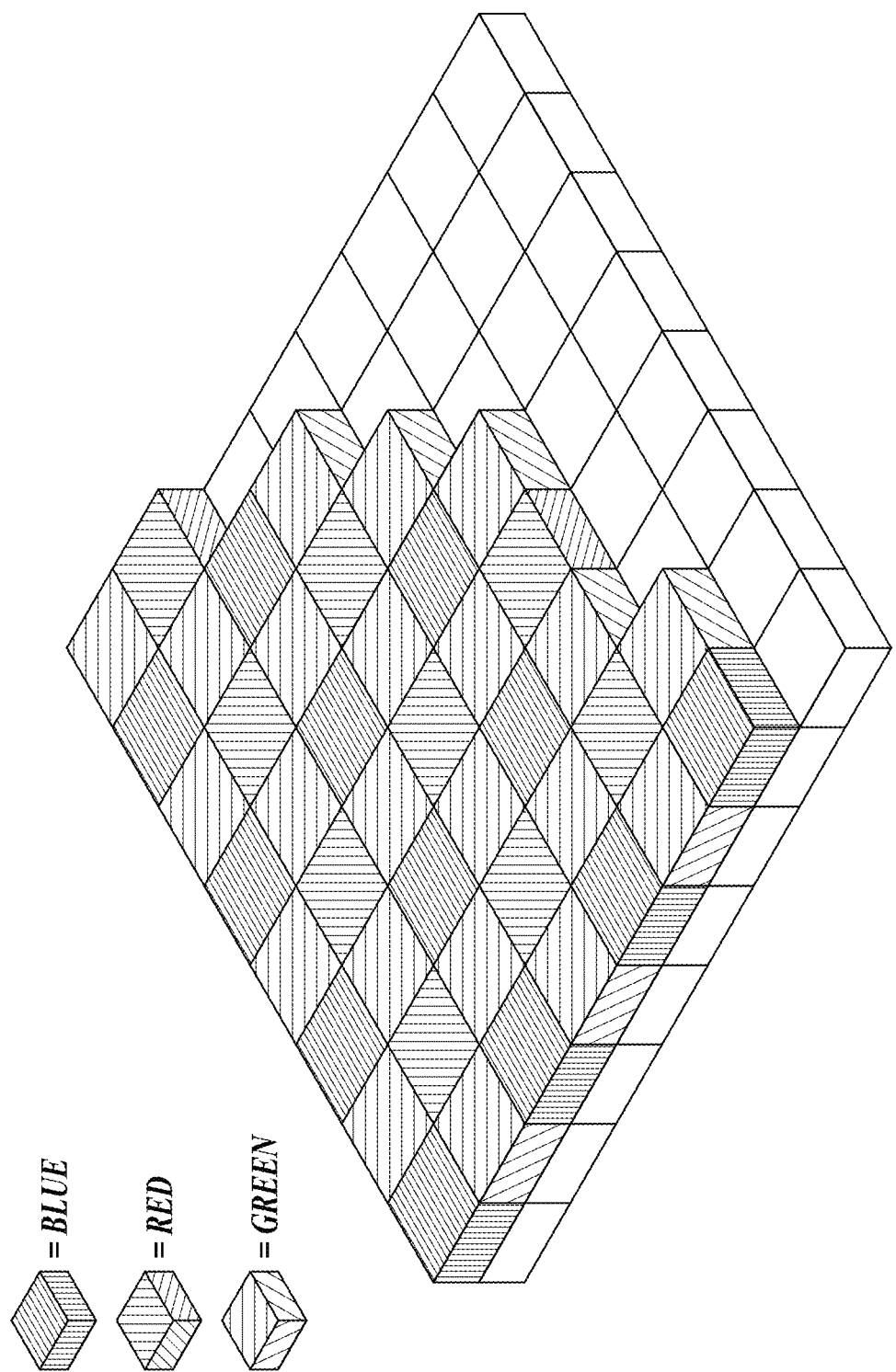
FIG. 13A illustrates a Bayer filter disposed over a photodetector, in accordance with an embodiment of the present disclosure.

In an embodiment, the methods of the present disclosure include increasing the frame rate during wavelength interleaving is to use the sensor's filter properties to acquire multiple color channels simultaneously. Many image sensors have a Bayer filter over the pixels that can be used to generate color images. An example of a photodetector, such as photodetector 716, and a filter positioned over the pixels of the photodetector, in accordance with an embodiment of the present disclosure, is illustrated in FIG. 13A.

In an embodiment, the photodetector is configured to detect multiple, separate types of colors simultaneously by using Bayer filters with the following wide band filter properties: blue (~400-500 nm), green (~500-600 nm) and red filter (≧600 nm). It is, therefore, possible to unmix the contributions of up to three types of spectral illuminations using a single sensor frame. However, detecting additional spectral illuminations (like Color ICG mode which requires the detection of four spectral channels: red, green, blue, near-infrared) can include capturing additional sensor frames.

Figure 13B:
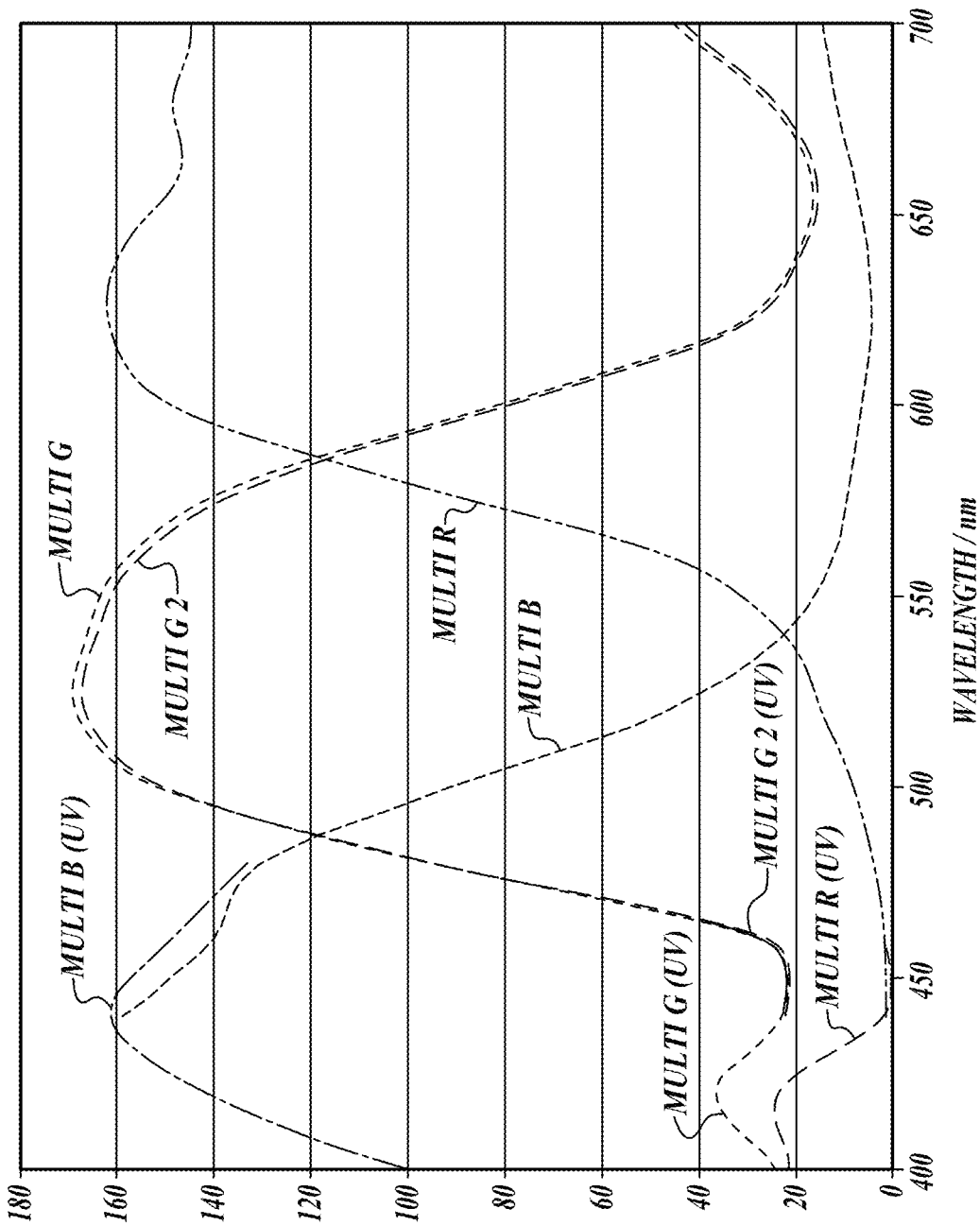
FIG. 13B illustrates filtered light transmitted to pixels of the photodetector of FIG. 13A, in accordance with an embodiment of the present disclosure.

The Bayer filter is a repeating pattern of filters (see FIG. 13A) with different transmission properties for red, green, and blue light (see FIG. 13B). In the examples above, if light 1 includes, for example, light having a red wavelength and light having a blue wavelength and light 2 includes light having a different red wavelength and a different blue wavelength, then it is possible to acquire four different wavelengths of data in two consecutive rolling shutter frames. Similarly, if light 1 was composed of a red wavelength and blue wavelength light and light 2 was composed of a green wavelength light, then it is possible to detect the red, green, and blue channels with minimal cross-talk (e.g., the blue light leaking into the green filter). And if three carefully chosen wavelengths with minimal cross-talk between the filters illuminated the sample simultaneously, there is the potential for 6 different wavelengths of data in two consecutive rolling shutter frames. Reducing the cross-talk can be especially important when the accuracy of the reflectance needs to be quantitative, such as in ICG and hyperspectral imaging modalities.

Figure 14:
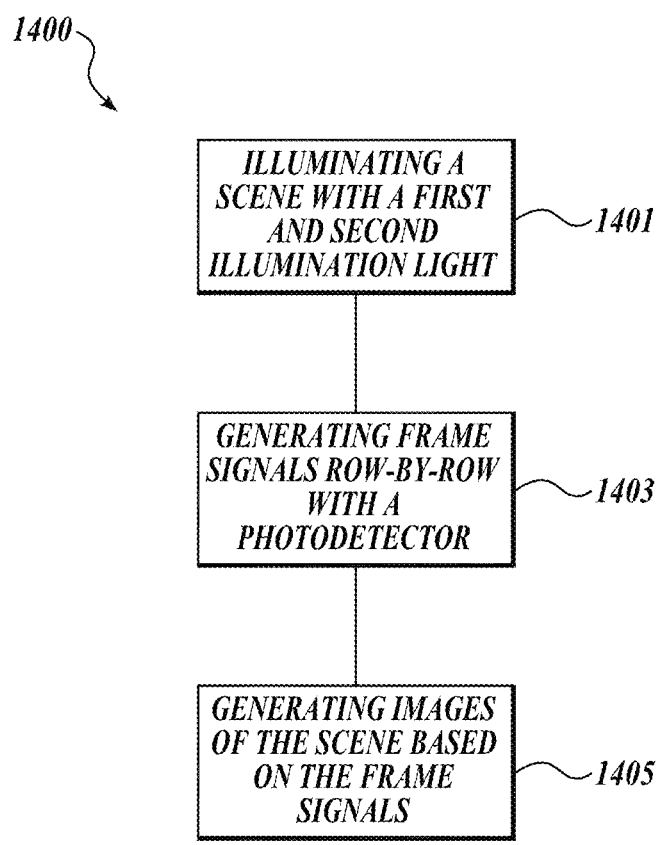
FIG. 14 illustrates a block diagram of a method, in accordance with an embodiment of the present disclosure.

An embodiment of the methods of the present disclosure will now be described with respect to FIG. 14. FIG. 14 is a block diagram illustrating a method 1400 according to an embodiment of the present disclosure. In an embodiment, method 1400 is a method suitable for use with one or more of the systems according to an embodiment of the present disclosure, such as system 700.

In the illustrated embodiment, method 1400 begins with process block 1401, which includes illuminating a scene with first illumination light from a first light source and second illumination light from a second light source. In an embodiment, illuminating the scene with the first illumination light and the second illumination light includes emitting a plurality of pulses of the first illumination light with the first light source; and emitting a plurality of pulses of the second illumination light with the second light source interleaved between the plurality of pulses of the first illumination light. As discussed further herein, in an embodiment, a light pulse of the plurality of first illumination light is captured by two sequential frames of the photodetector, as describe with respect to process block 1403.

In an embodiment, the first illumination light is in a first wavelength range, and wherein the second illumination light is in a second wavelength range different from the first wavelength range. In an embodiment, one of the first illumination light and the second illumination light includes structured light, such as light including a known pattern. As discussed elsewhere herein, by illuminating the scene with light of different wavelengths and/or with structured light, particularly as pulsed light, additional information can be obtained over simply illuminating the scene with light of a single wavelength range.

In an embodiment, a pulse of the plurality of pulses of the first illumination light has a duration different than a duration of the plurality of pulses of the second illumination light. In an embodiment, a pulse of the plurality of pulses of the first illumination light has a duration the same a duration of the plurality of pulses of the second illumination light. In an embodiment, there is no time between a pulse of the plurality of pulses of the first illumination light and a pulse of the plurality of pulses of the second illumination light. In an embodiment, the plurality of pulses of the first illumination light are interleaved with the plurality of pulses of the second illumination light, as illustrated in, for example, FIG. 8.

In an embodiment, process block 1401 is followed by process block 1403, which includes generating frame signals with the photodetector based on light received from the scene. In an embodiment, generating frame signals with the photodetector based on light received from the scene includes sequentially integrating rows of pixels of the plurality of rows. In this regard, process block 1403 can include generating first signals with a first row of pixels of the photodetector based on light received from the scene during a first integration time; and generating second frame signals with a second row of pixels of the photodetector based on light received from the scene during a second integration time, wherein the second row of pixels is immediately adjacent to the first row of pixels and the second integration time is after the first integration time. In an embodiment, generating signals with the photodetector includes generating signals without blanking time.

In an embodiment, process block 1401 includes illuminating the scene with a plurality of light pulses of first illumination light and/or a plurality of light pulses of the second illumination light during a single frame. See, for example, FIG. 12.

In an embodiment, a frame signal includes signals from pixels of each of the plurality of rows. In this regard, in an embodiment, a light pulse of the plurality of first illumination light is captured by two sequential frames. In an embodiment, a light pulse of the plurality of the second illumination light is captured by two sequential frames.

In an embodiment, process block 1403 is followed by process block 1405, which includes generating images of the scene based on an intensity of the frame signals and the proportion of the first illumination light and the second illumination light emitted onto the scene during the first and second frames. In an embodiment, a proportion of the first illumination light and the second illumination light in a first frame is different than in a second frame.

This different proportion of illumination light in adjacent frames can be used to disentangle frame signals from the adjacent frames. As discussed further herein with respect to FIG. 8, because each frame includes illumination light from both the first and second light source, frame signals derived from adjacent frames may require disentanglement. Such disentanglement of a frame signal from a frame N can be accomplished with equation (1):

$$S_N(i,j) = \text{frac}_{N,L1}(i,j) S_{L1}(i,j) + \text{frac}_{N,L2}(i,j) S_{L2}(i,j) \quad \text{equation (1),}$$

wherein—
$\text{frac}_{N,L1}(i,j)$ is a fraction of an integration time that $\text{pixel}_{i,j}$ was exposed to the first illumination light during frame N,
$\text{frac}_{N,L2}(i,j)$ is a fraction of the integration time that $\text{pixel}_{i,j}$ was exposed to the second illumination light during frame N,
$S_{L1}(i,j)$ is a signal generated by $\text{pixel}_{i,j}$ if $\text{pixel}_{i,j}$ was illuminated by the first illumination light during all of the integration time, and
$S_{L2}(i,j)$ a signal generated by $\text{pixel}_{i,j}$ if $\text{pixel}_{i,j}$ was illuminated by the second illumination light during all of the integration time.

Likewise, in an embodiment, a frame signal from a frame N+1 immediately following frame N can be disentangled with equation (2):

$$S_{N+1}(i,j) = \text{frac}_{N+1,L1}(i,j) S_{L1}(i,j) + \text{frac}_{N+1,L2}(i,j) S_{L2}(i,j) \quad \text{equation (2),}$$

wherein $\text{frac}_{N+1,L1}(i,j)$ is a fraction of an integration time $\text{pixel}_{i,j}$ was exposed to the first illumination light during frame N+1, and $\text{frac}_{N+1,L2}(i,j)$ is a fraction of the integration time this pixel was exposed to the second illumination light during frame N+1.

Because the above metrics are known quantities, such metrics that can be saved in system memory, signals based on adjacent frames N and N+1 can be disentangled, and an image or series of images can be generated therefrom.

In an embodiment, the image or series of images is displayed on a display, such as in the form of a video feed.

The order in which some or all of the process blocks appear in each process should not be deemed limiting. Rather, one of ordinary skill in the art having the benefit of the present disclosure will understand that some of the process blocks may be executed in a variety of orders not illustrated, or even in parallel.

Some processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:
1. A system comprising:
   a light engine configured to illuminate a scene, the light engine comprising:
      a first light source configured emit first illumination light; and
      a second light source configured to emit second illumination light;
   a photodetector positioned to receive light from the scene, the photodetector comprising a plurality of pixels responsive to light and arranged in a plurality of rows; and a controller operatively coupled to the light engine and the photodetector, the controller including logic that, when executed by the controller, causes the system to perform operations including:
- illuminating the scene with the first illumination light from the first light source and the second illumination light from the second light source;
- generating frame signals with the photodetector based on light received from the scene with sequentially integrated rows of pixels of the plurality of rows, wherein a frame signal includes signals from pixels of each of the plurality of rows; and
- generating images of the scene based on an intensity of the frame signals and the proportion of the first illumination light and the second illumination light emitted onto the scene during the first and second frames, wherein a proportion of the first illumination light and the second illumination light in a first frame is different than in a second frame.

2. The system of claim 1, wherein illuminating the scene with the first illumination light and the second illumination light includes:
- emitting a plurality of pulses of the first illumination light with the first light source; and
- emitting a plurality of pulses of the second illumination light with the second light source interleaved between the plurality of pulses of the first illumination light,
- wherein a light pulse of the plurality of first illumination light is captured by two sequential frames.

3. The system of claim 2, wherein a light pulse of the plurality of the second illumination light is captured by two sequential frames.

4. The system of claim 2, wherein a pulse of the plurality of pulses of the first illumination light has a duration different than a duration of the plurality of pulses of the second illumination light.

5. The system of claim 1, wherein generating frame signals with the photodetector based on light received from the scene with sequentially integrated rows of pixels of the plurality of rows includes:
- generating first signals with a first row of pixels of the photodetector based on light received from the scene during a first integration time; and
- generating second frame signals with a second row of pixels of the photodetector based on light received from the scene during a second integration time,
- wherein the second row of pixels is immediately adjacent to the first row of pixels and the second integration time is after the first integration time.

6. The system of claim 1, wherein a frame signal from a $pixel_{i,j}$ of the photodetector in a frame N is according to equation (1):

$$S_N(i,j) = \text{frac}_{N,L1}(i,j) S_{L1}(i,j) + \text{frac}_{N,L2}(i,j) S_{L2}(i,j) \quad \text{equation (1)},$$

wherein—
- $\text{frac}_{N,L1}(i,j)$ is a fraction of an integration time that $pixel_{i,j}$ was exposed to the first illumination light during frame N,
- $\text{frac}_{N,L2}(i,j)$ is a fraction of the integration time that $pixel_{i,j}$ was exposed to the second illumination light during frame N,
- $S_{L1}(i,j)$ is a signal generated by $pixel_{i,j}$ if $pixel_{i,j}$ was illuminated by the first illumination light during all of the integration time, and
- $S_{L2}(i,j)$ a signal generated by $pixel_{i,j}$ if $pixel_{i,j}$ was illuminated by the second illumination light during all of the integration time.

7. The system of claim 1, wherein a frame signal from a frame N+1 immediately following frame N is according to equation (2)

$$S_{N+1}(i,j) = \text{frac}_{N+1,L1}(i,j) S_{L1}(i,j) + \text{frac}_{N+1,L2}(i,j) S_{L2}(i,j) \quad \text{equation (2)},$$

wherein—
- $\text{frac}_{N+1,L1}(i,j)$ is a fraction of an integration time $pixel_{i,j}$ was exposed to the first illumination light during frame N+1, and
- $\text{frac}_{N+1,L2}(i,j)$ is a fraction of the integration time $pixel_{i,j}$ was exposed to the second illumination light during frame N+1.

8. The system of claim 1, further comprising a filter positioned to filter first and second illumination light received from the scene and provide filtered light to the photodetector,
wherein the filter comprises:
- a plurality of first filter pixels positioned to filter illumination light incident on a first set of pixels of the photodetector and configured to transmit light in a first filtered wavelength range; and
- a plurality of second filter pixels positioned to filter illumination light incident on a second set of pixels of the photodetector and configured to transmit light in a second filtered wavelength range, wherein the second filtered wavelength range is different than the first filtered wavelength range.

9. The system of claim 1, further comprising an endoscope coupled to and configured to receive from the light engine and shaped to illuminate the scene with the illumination light.

10. The system of claim 1, wherein the first illumination light is in a first wavelength range, and wherein the second illumination light is in a second wavelength range different from the first wavelength range.

11. The system of claim 1, wherein the second light source is configured to emit structured light, and
wherein the controller includes logic that, when executed by the controller, causes the system to perform operations including:
- determining a distance between features of the scene based on structured light received from the scene by the photodetector.

12. A non-transitory, machine-readable storage medium having instructions stored thereon, which when executed by a processing system, cause the processing system to perform a method comprising:
- illuminating a scene with first illumination light from a first light source and second illumination light from a second light source;
- generating frame signals with a photodetector comprising a plurality of pixels responsive to light and arranged in a plurality of rows, wherein the frame signals are based on light received from the scene with sequentially integrated rows of pixels of the plurality of rows, and wherein a frame signal includes signals from pixels of each of the plurality of rows; and
- generating images of the scene based on an intensity of the frame signals and the proportion of the first illumination light and the second illumination light emitted onto the scene during the first and second frames, wherein a proportion of the first illumination light and the second illumination light in a first frame is different than in a second frame.

13. The non-transitory, machine-readable storage medium of claim 12, wherein illuminating the scene with the first illumination light and the second illumination light includes:

emitting a plurality of pulses of the first illumination light with the first light source; and emitting a plurality of pulses of the second illumination light with the second light source interleaved between the plurality of pulses of the first illumination light, wherein a light pulse of the plurality of first illumination light is captured by two sequential frames.

14. The non-transitory, machine-readable storage medium of claim 13, wherein a light pulse of the plurality of the second illumination light is captured by two sequential frames.

15. The non-transitory, machine-readable storage medium of claim 13, wherein a pulse of the plurality of pulses of the first illumination light has a duration different than a duration of the plurality of pulses of the second illumination light.

16. The non-transitory, machine-readable storage medium of claim 12, wherein generating frame signals with the photodetector based on light received from the scene with sequentially integrated rows of pixels of the plurality of rows includes:

generating first signals with a first row of pixels of the photodetector based on light received from the scene during a first integration time; and generating second frame signals with a second row of pixels of the photodetector based on light received from the scene during a second integration time, wherein the second row of pixels is immediately adjacent to the first row of pixels and the second integration time is after the first integration time.

17. The non-transitory, machine-readable storage medium of claim 12, wherein a frame signal from a pixel$_{i,j}$ of the photodetector in a frame N is according to equation (1):

$$S_N(i,j) = \text{frac}_{N,L1}(i,j) S_{L1}(i,j) + \text{frac}_{N,L2}(i,j) S_{L2}(i,j) \quad \text{equation (1),}$$

wherein— frac$_{N,L1}$(i,j) is a fraction of an integration time that pixel$_{i,j}$ was exposed to the first illumination light during frame N, frac$_{N,L2}$(i,j) is a fraction of the integration time that pixel$_{i,j}$ was exposed to the second illumination light during frame N, $S_{L1}$(i,j) is a signal generated by pixel$_{i,j}$ if pixel$_{i,j}$ was illuminated by the first illumination light during all of the integration time, and $S_{L2}$(i,j) a signal generated by pixel$_{i,j}$ if pixel$_{i,j}$ was illuminated by the second illumination light during all of the integration time.

18. The non-transitory, machine-readable storage medium of claim 17, wherein a frame signal from a frame N+1 immediately following frame N is according to equation (2):

$$S_{N+1}(i,j) = \text{frac}_{N+1,L1}(i,j) S_{L1}(i,j) + \text{frac}_{N+1,L2}(i,j) S_{L2}(i,j) \quad \text{equation (2),}$$

wherein— frac$_{N+1,L1}$(i,j) is a fraction of an integration time pixel$_{i,j}$ was exposed to the first illumination light during frame N+1, and frac$_{N+1,L2}$(i,j) is a fraction of the integration time pixel$_{i,j}$ was exposed to the second illumination light during frame N+1.

19. The non-transitory, machine-readable storage medium of claim 12, wherein the first illumination light is in a first wavelength range, and wherein the second illumination light is in a second wavelength range different from the first wavelength range.

20. A method for imaging a scene, the method comprising:

illuminating a scene with first illumination light from a first light source and second illumination light from a second light source;

generating frame signals with a photodetector comprising a plurality of pixels responsive to light and arranged in a plurality of rows, wherein the frame signals are based on light received from the scene with sequentially integrated rows of pixels of the plurality of rows, and wherein a frame signal includes signals from pixels of each of the plurality of rows; and generating images of the scene based on an intensity of the frame signals and the proportion of the first illumination light and the second illumination light emitted onto the scene during the first and second frames, wherein a proportion of the first illumination light and the second illumination light in a first frame is different than in a second frame.

\* \* \* \* \*

UNITED STATES PATENT AND TRADEMARK OFFICE
CERTIFICATE OF CORRECTION

Page 1 of 1

PATENT NO. : 11,528,434 B1
APPLICATION NO. : 17/562781
DATED : December 13, 2022
INVENTOR(S) : A. Bouvier et al.

It is certified that error appears in the above-identified patent and that said Letters Patent is hereby corrected as shown below:

In the Claims

| Column | Line | Claim | |
|--------|------|-------|---|
| 12 | 60 | 1 | change "emit" to -- to emit --. |

Signed and Sealed this
Eleventh Day of July, 2023

Katherine Kelly Vidal
*Director of the United States Patent and Trademark Office*